US008983385B2

(12) United States Patent
Macholz

(10) Patent No.: US 8,983,385 B2
(45) Date of Patent: *Mar. 17, 2015

(54) ENTERTAINMENT SYSTEM INCLUDING SELECTABLE IR RECEIVE AND TRANSMIT CODES AND DAY/NIGHT PICTURE MODES

(71) Applicant: Voxx International Corporation, Hauppauge, NY (US)

(72) Inventor: Jeff Macholz, Patchogue, NY (US)

(73) Assignee: Voxx International Corporation, Hauppauge, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/016,379

(22) Filed: Sep. 3, 2013

(65) Prior Publication Data
US 2014/0002747 A1  Jan. 2, 2014

Related U.S. Application Data

(63) Continuation of application No. 11/671,516, filed on Feb. 6, 2007, now Pat. No. 8,527,021.

(51) Int. Cl.
H04B 7/00 (2006.01)
H04N 5/44 (2011.01)
H04B 1/08 (2006.01)
H04B 1/20 (2006.01)

(52) U.S. Cl.
CPC ............ *H04N 5/4403* (2013.01); *H04B 1/082* (2013.01); *H04B 1/207* (2013.01)
USPC .................. 455/41.2; 455/569.2; 455/575.9; 455/550.1; 455/569.1

(58) Field of Classification Search
USPC ............ 455/41.2, 569.2, 575.9, 550.1, 569.1
See application file for complete search history.

(56) References Cited

U.S. PATENT DOCUMENTS

| 6,055,478 | A  | * | 4/2000  | Heron ........................... 701/486 |
|-----------|----|---|---------|------------------------------------------|
| 6,266,815 | B1 | * | 7/2001  | Shen et al. ...................... 725/76 |
| 6,330,337 | B1 | * | 12/2001 | Nicholson et al. .............. 381/86 |
| 6,567,012 | B1 | * | 5/2003  | Matsubara et al. ........ 340/12.28 |
| 6,719,343 | B2 | * | 4/2004  | Emerling et al. .......... 296/24.34 |
| 6,742,185 | B1 | * | 5/2004  | Andrews ........................ 725/75 |
| 6,762,741 | B2 | * | 7/2004  | Weindorf ..................... 345/102 |
| 6,778,966 | B2 | * | 8/2004  | Bizjak .......................... 704/500 |
| 7,050,795 | B2 | * | 5/2006  | Wiegand et al. .............. 455/419 |
| 7,136,115 | B2 |   | 11/2006 | Chen |
| 7,428,454 | B2 | * | 9/2008  | Shikano et al. ................ 701/36 |
| 7,606,982 | B2 | * | 10/2009 | Hwang et al. ................. 711/147 |
| 7,757,258 | B2 | * | 7/2010  | Muench-Casanova et al. 725/75 |
| 7,909,397 | B2 | * | 3/2011  | Shalam et al. ............. 297/217.3 |
| 2003/0055635 | A1 | * | 3/2003 | Bizjak .......................... 704/225 |
| 2005/0148376 | A1 | * | 7/2005 | Kucera ............................. 463/1 |
| 2006/0155429 | A1 | * | 7/2006 | Boone et al. ..................... 701/1 |
| 2007/0022194 | A1 | * | 1/2007 | Brown et al. ................. 709/224 |
| 2007/0108788 | A1 | * | 5/2007 | Shalam et al. ............. 296/37.15 |
| 2007/0114354 | A1 | * | 5/2007 | Jeon et al. ..................... 248/371 |

* cited by examiner

*Primary Examiner* — April G Gonzales
(74) *Attorney, Agent, or Firm* — F. Chau & Associates, LLC

(57) ABSTRACT

An entertainment system for a vehicle, including a media player and a control panel having an option that allows a user to select either a first communication mode or a second communication mode, wherein the first communication mode sets the entertainment system to respond to a transmitted first set of codes and the second communication mode sets the entertainment system to respond to a transmitted second set of codes.

20 Claims, 6 Drawing Sheets

FIG. 1

ENTERTAINMENT SYSTEM INCLUDING SELECTABLE IR RECEIVE AND TRANSMIT CODES AND DAY/NIGHT PICTURE MODES

PRIORITY STATEMENT

This application is a continuation application of co-pending U.S. application Ser. No. 11/671,516 filed Feb. 6, 2007, the disclosure of which is hereby incorporated by reference herein in its entirety.

BACKGROUND OF THE INVENTION

1. Technical Field

The present disclosure relates to an entertainment system for use in a vehicle, and more particularly to an entertainment system with selectable IR receive/transmit codes and day/night picture modes.

2. Discussion of the Related Art

Entertainment consoles mounted in vehicles provide video and audio entertainment to passengers therein. Some known designs include consoles having a screen for displaying video and a media source, such as a video cassette player (VCP), a digital video disc (DVD) player, a HDD/memory card reader, etc.

Known vehicle mounted consoles are programmed to receive a single set of commands from a remote control. As an example, when two consoles of the same manufacturer are mounted together in a vehicle, any one of the provided remote controls will operate both of the consoles. However, this can be problematic since a passenger may wish to adjust one of the consoles to play a particular media source without affecting the other console.

Accordingly, there is a need for a mounted console in a vehicle that can be separately controlled from another console using a single remote.

Further, known vehicle mounted consoles output audio signals from a media player to a single sound system in the vehicle and cannot be easily configured to output audio signals to a different sound system in the vehicle. As an example, it may be desirable to toggle between sound systems for passengers sitting in different parts of the vehicle.

Accordingly, there is a need for a mounted console that can be programmed to output audio signals to a particular vehicle sound system.

Moreover, the brightness of known vehicle mounted consoles can not be easily adjusted. A typical vehicle mounted console makes use of an LCD display to save space and reduce energy consumption. However, the visibility of a typical LCD display is greatly affected by environmental lighting. Such a console may be viewed under various environmental lighting conditions, ranging anywhere between the near complete darkness of a moonless night to the extreme light of a bright and sunny afternoon. These environmental lighting conditions can often change quite rapidly based on the weather.

Accordingly, there is a need for a vehicle mounted entertainment system with day and evening light modes that can be remotely selected.

SUMMARY OF THE INVENTION

An entertainment system for a vehicle, according to an exemplary embodiment of the present invention, comprises a media player, and a control panel having an option that allows a user to select a first communication mode or a second communication mode, wherein the first communication mode sets the overhead entertainment system to respond to a transmitted first set of codes and the second communication mode sets the overhead entertainment system to respond to a transmitted second set of codes.

The first set of codes may be transmitted by a remote control set to a first transmission mode and the second set of codes may be transmitted by the remote control set to a second transmission mode.

The media player may be one of an MPEG player, a card reader, a DVD player, a CD-ROM player, a video game player, a videocassette player, or a digital video recorder. The first modulator and the second modulator may be capable of receiving audio signals for modulation from a media source connected to the entertainment system via at least one port. The at least one port may be one of a universal serial bus port, an audio input port, a video input port or an audio/video input port.

The entertainment system may be capable of receiving and playing at least one of a digital video disc, a compact disc, a video compact disc, a flash card, a secure digital card, a smart media card or a memory stick card.

The first communication mode may set the entertainment system to output an audio signal from the media player to a first audio channel and the second communication mode may set the overhead entertainment system to output the audio signal from the media player to a second audio channel.

The output of the audio signal may be a wireless transmission. When the output of the audio signal is a wireless transmission, a first wireless sound system may be set to only receive the audio signal from the first channel and a second wireless sound system may be set to only receive the audio signal from the second audio channel.

The entertainment system may further include a display unit having an adjustable brightness level which is set by remotely selecting either a day brightness mode or a night brightness mode. The brightness level of the display unit may be set to pre-determined level stored in the overhead entertainment system when the night brightness mode is selected. The pre-determined night level may be set by a user through the control panel of the overhead entertainment system. The brightness level of the display unit may also be set to a pre-determined level stored in the overhead entertainment unit when the day brightness mode is selected. The pre-determined level may be set by a user through the control panel of the entertainment system.

An entertainment system for a vehicle, according to an exemplary embodiment of the present invention, comprises a media player, and a control panel having an option that allows a user to select a first communication mode or a second communication mode, wherein the first communication mode sets the entertainment system to output audio signals from the media player across a first channel and to receive a first set of commands from a remote control and the second communication mode sets the entertainment system to output the audio signals across a second channel and to receive a second set of commands from the remote control.

An entertainment system for a vehicle, according to an exemplary embodiment of the present invention, comprises a media player, a receiver unit for receiving remote commands, a display unit having a brightness mode which can be toggled between a first brightness mode and a second brightness mode by the remote commands, and a control panel having a brightness control for adjusting a first brightness level for the first brightness mode and a second brightness level for the second brightness mode.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

Exemplary embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
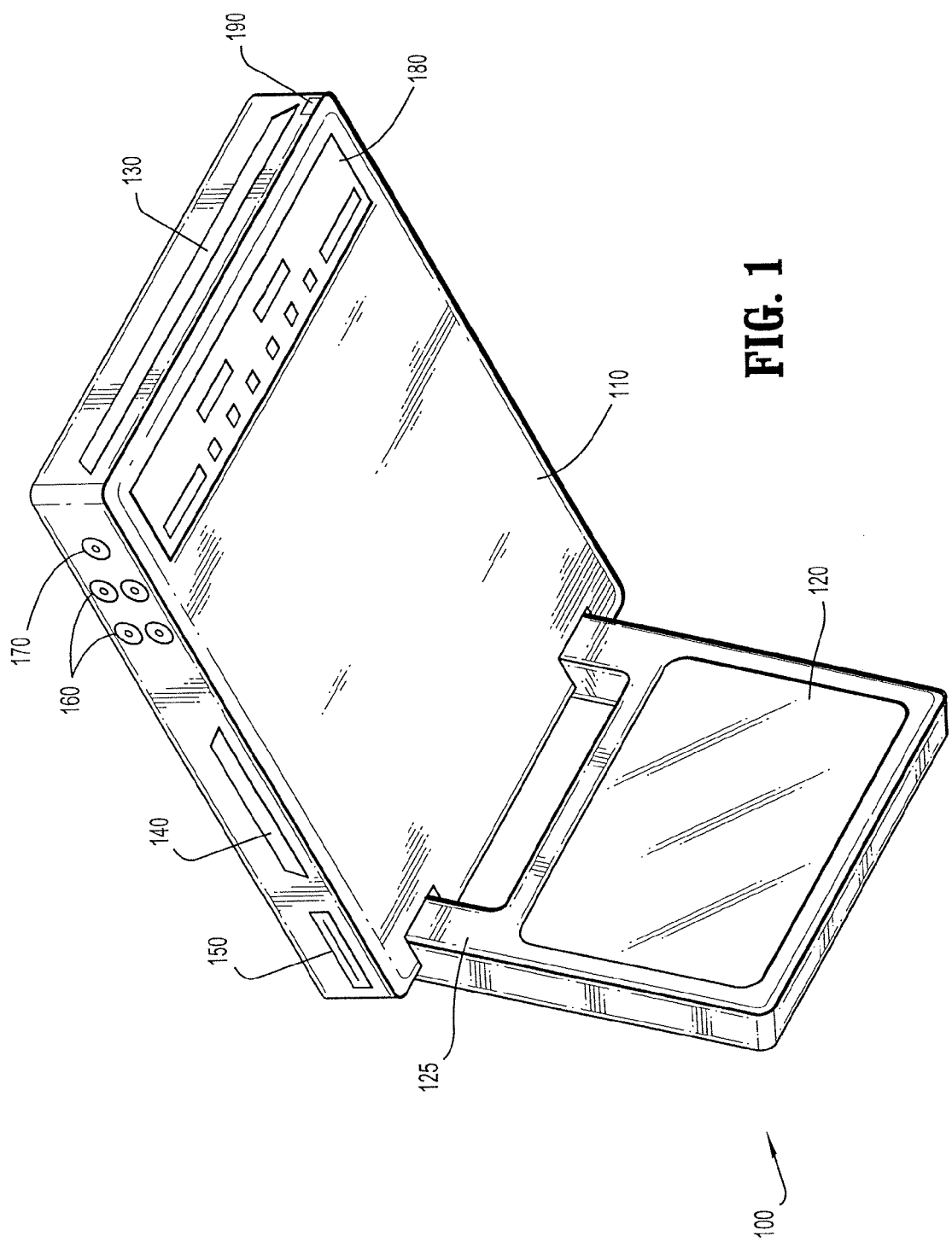
FIG. 1 shows a perspective view of an overhead entertainment unit, according to an exemplary embodiment of the present invention.

FIG. 1 shows a perspective view of an overhead entertainment unit 100, according to an exemplary embodiment of the present invention. It is to be understood that while reference is made to overhead entertainment units in exemplary embodiments described below, the present invention is not limited thereto. For example, features described in exemplary embodiments may also be applied to floor, dashboard, and seat mounted entertainment systems.

Referring to FIG. 1, an overhead entertainment unit 100 includes a display 120, which is preferably a liquid crystal display (LCD). Alternatively, the display 120 can be a cathode ray tube (CRT), gas plasma or organic electro-luminescent display (OELD) device. The display 120 is preferably supported from the entertainment unit 100 by a hinged mechanism 125 and swings to different viewing angles and folds flat against a body portion 110 of the entertainment unit 100 when not in use.

The entertainment unit 100 includes slots 130 and 140 of different sizes for receiving DVDs, compact discs (CDs), video CDs (VCDs), flash cards, secure digital (SD) cards, smart media (SM) cards and memory stick (MS) cards. Accordingly, the entertainment unit 100 includes media players, such as card readers and DVD and CD players, capable of reading various types of media storage mediums. The entertainment unit 100 can transfer audio data to an audio output, such as headphones or a vehicle sound system and transfer video data to a video output, such as the display 120. As an alternative to using slots, media storage mediums can also be inserted into the docking station using a clamshell type design, whereby a door of the entertainment unit 100 is opened to allow insertion of a media storage medium therein. In addition, a drawer type design may also be implemented whereby a holder for a media storage medium slides out of the entertainment unit 100 (like a drawer) to permit insertion of a media storage device in the holder.

The entertainment unit 100 also includes ports for connecting to external media devices, such as a universal serial bus (USB) port 150 and input/output ports 160. The ports 150 and 160 are used to connect devices, such as an MPEG player, a card reader, a DVD player, a CD-ROM player, a video game player, a videocassette player, and a digital video recorder. For example, audio input ports include XLR and RCA jacks and video input ports include S-video connections, RCA connections, F-connections, and component video. The entertainment unit 100 includes a headphone port 170 for sending audio to headphones. A power port may be included among the input/output ports 160 for connecting to a vehicle power supply through an adapter, such as cigarette lighter adapter. The entertainment unit 100 preferably receives power through a vehicle's wiring harness.

The slots 130 and 140 and the ports 150, 160 and 170 may be positioned in any appropriate location on the entertainment unit 100 and are not restricted to the locations shown in FIG. 1. Similarly, the number of slots and ports may be more or less than that shown in FIG. 1.

The entertainment unit 100 includes a control panel 180 with a variety of control buttons for controlling, for example, power, mode (e.g., DVD, AUX), screen characteristics, and functions of a media source, such as stop, pause, previous, play and next. The control buttons enable a user to control display characteristics and which programs from which sources are displayed. Additional control buttons can include volume control and channel selection. A channel selection button is used to select a frequency, such as 88.1 MHz, for broadcast of audio if audio is being broadcast wirelessly to headphones or to the vehicle's sound system. The control panel also includes one or more buttons to toggle between receipt and transmission of different transmit and receive codes.

The entertainment unit 100 also includes an infra-red (IR) sensor 190 for receiving signals for control of the entertainment unit 100 from a remote control device.

Figure 2:
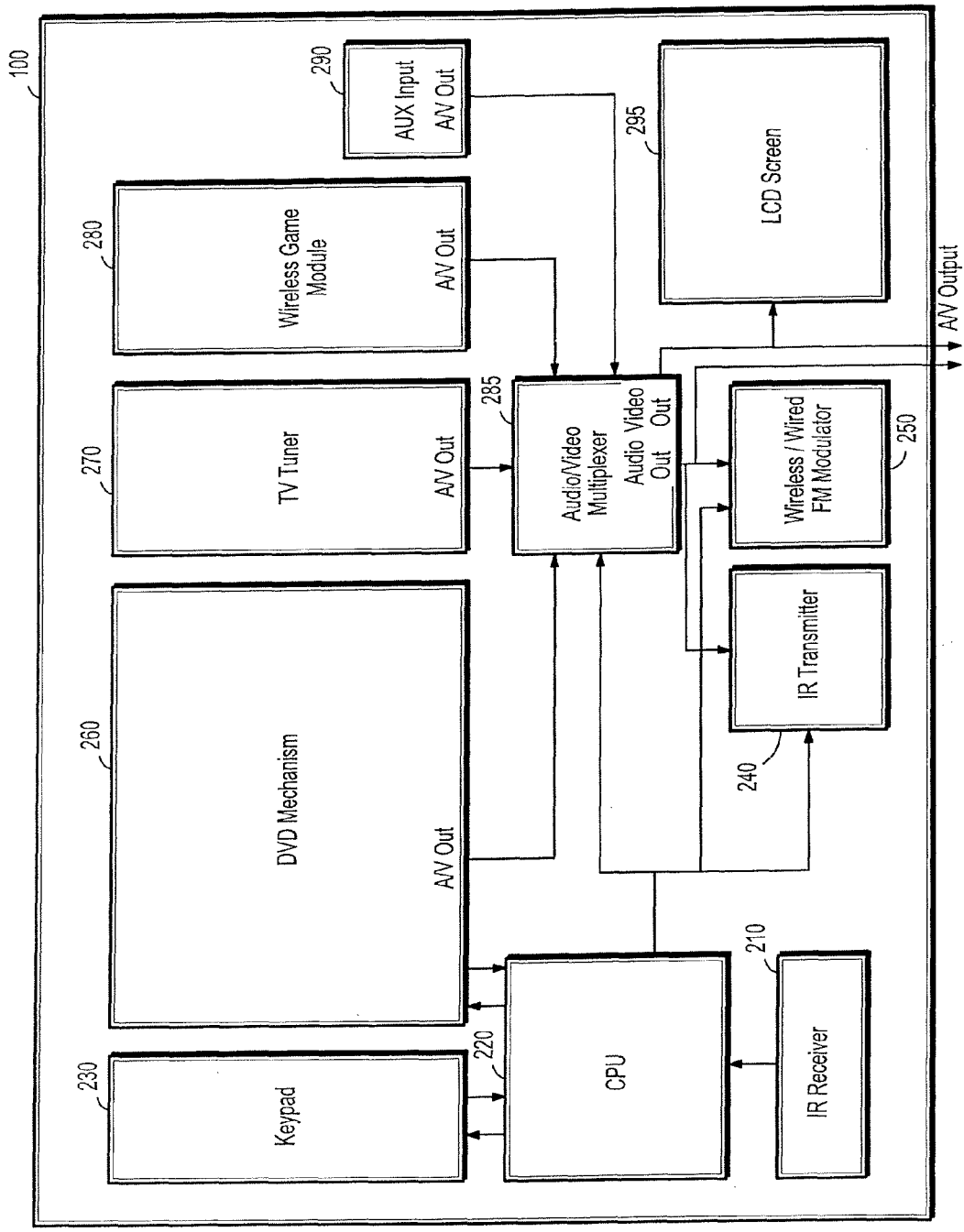
FIG. 2 is a high-level block diagram of an entertainment unit, according to an exemplary embodiment of the present invention.

FIG. 2 is a high-level block diagram of an entertainment unit, according to an exemplary embodiment of the present invention. Referring to FIG. 2, the entertainment unit 100 includes an IR receiver 210, a CPU 220, a Keypad 230, an IR transmitter, an FM Modulator 250, a DVD mechanism 260, an audio/video multiplexer 285, and LCD screen 295, a TV Tuner 270, a Wireless Game Module 280, and an AUX input 290. The TV Tuner 270, Wireless Game Module 280, and AUX input are optional.

The Keypad 230 (i.e., a control panel) includes a control for setting the entertainment unit 100 to one of an M1 and M2 mode which represent different modes of communication. In an exemplary embodiment of the present invention, the keypad may include a key labeled "FMM" and a key labeled "SOURCE" which may be depressed together for three seconds to toggle the entertainment unit 100 back and forth between the M1 and M2 modes.

The CPU 220 receives key presses from the Keypad 230 and interprets the remote control commands it receives from the IR Receiver 210. The CPU can interpret at least two sets of remote control codes. When the entertainment unit 100 is set to the M1 mode, the CPU 220 ignores a second set of remote control codes and operates on a first. When the entertainment unit 100 is set to the M2 mode, the CPU 220 ignores the first set of remote control codes, and operates on the second. The CPU 220 then relays data to the DVD mechanism (e.g., a DVD player or other similar device) 260 that corresponds to the command operated on. The entertainment unit 100 is not limited to a DVD player, as any other suitable media player may be used instead, such as, for example, an MPEG player, a card reader, a CD-ROM player, a video game player, a video cassette player, or a digital video recorder, etc.

Audio and video signals are sent by the DVD mechanism 260 to the Audio/Video Multiplexer 285. The Audio/Video Multiplexer 285 in turn sends the audio signals to the FM Modulator 250 and the IR Transmitter 240, and the video signals to the LCD screen 295 for display. The FM Modulator 250 may be wired directly to an external sound system or may wirelessly broadcast the audio signals for reception by an external sound system (e.g., a car radio). The frequency of the FM Modulator 250 can be in the FM band, ranging from about 88 MHz to about 108 MHz or in a digital audio broadcast (DAB) band, including frequencies in and beyond the FM band, ranging from about 88 MHz to about 225 MHz. The frequency of the FM Modulator 250 may be tunable to a number of frequencies ranging in increments of 0.1 MHz. Alternatively, the Frequency Modulator 250 may modulate audio signals to a higher frequency range, with values exceeding 2.4 GHz.

The IR Transmitter 240 receives audio signals from the Audio/Video Multiplexer 285 for broadcast to wireless speakers or headphones. The IR Transmitter 240 can transmit audio signals across at least two different channels (e.g., a channel A and a channel B). The IR Transmitter 240 may transmit audio signals over two bands of frequencies. The first band may range from about 2.3 MHz to about 2.8 MHz and represents channel A. The second band may range from about 3.2 MHz to about 3.8 MHz and represents channel B. However, the present invention, is not limited to these frequency ranges, as channels A and B may vary as necessary. The transmission frequencies for channel A and channel B can be selected using a channel selection button on the Keypad 230 of the entertainment unit 100.

When an entertainment unit 100 is set to mode M1, the IR Transmitter 240 transmits the audio signals over channel A. When an entertainment unit 100 is set to mode M2, the IR Transmitter 240 transmits the audio signals over channel B. As an example, a vehicle may be equipped with two entertainment units 100, one set to an M1 mode and the other to an M2 mode. A user with wireless headphones which are selectable for receiving audio communication across channels A and B can listen to either of the entertainment units 100.

The TV Tuner 270 is optional and enables the entertainment unit 200 to receive television broadcasts. The wireless game module 280 is also optional and enables the entertainment unit to play electronic video games which may be downloaded wirelessly from a remote source. The entertainment unit 100 may also include the AUX input 290 for plugging in an additional external audio/video device (e.g., a VCR, additional DVD player, games system, etc.) The entertainment unit 100 may also include additional AUX inputs. The currently active audio/video device can be selected by the Keypad 230 or a remote control. The CPU 220 will in turn direct the Audio/Video Multiplexer 285 to output audio and video signals from the currently active audio/video device.

Figure 3:
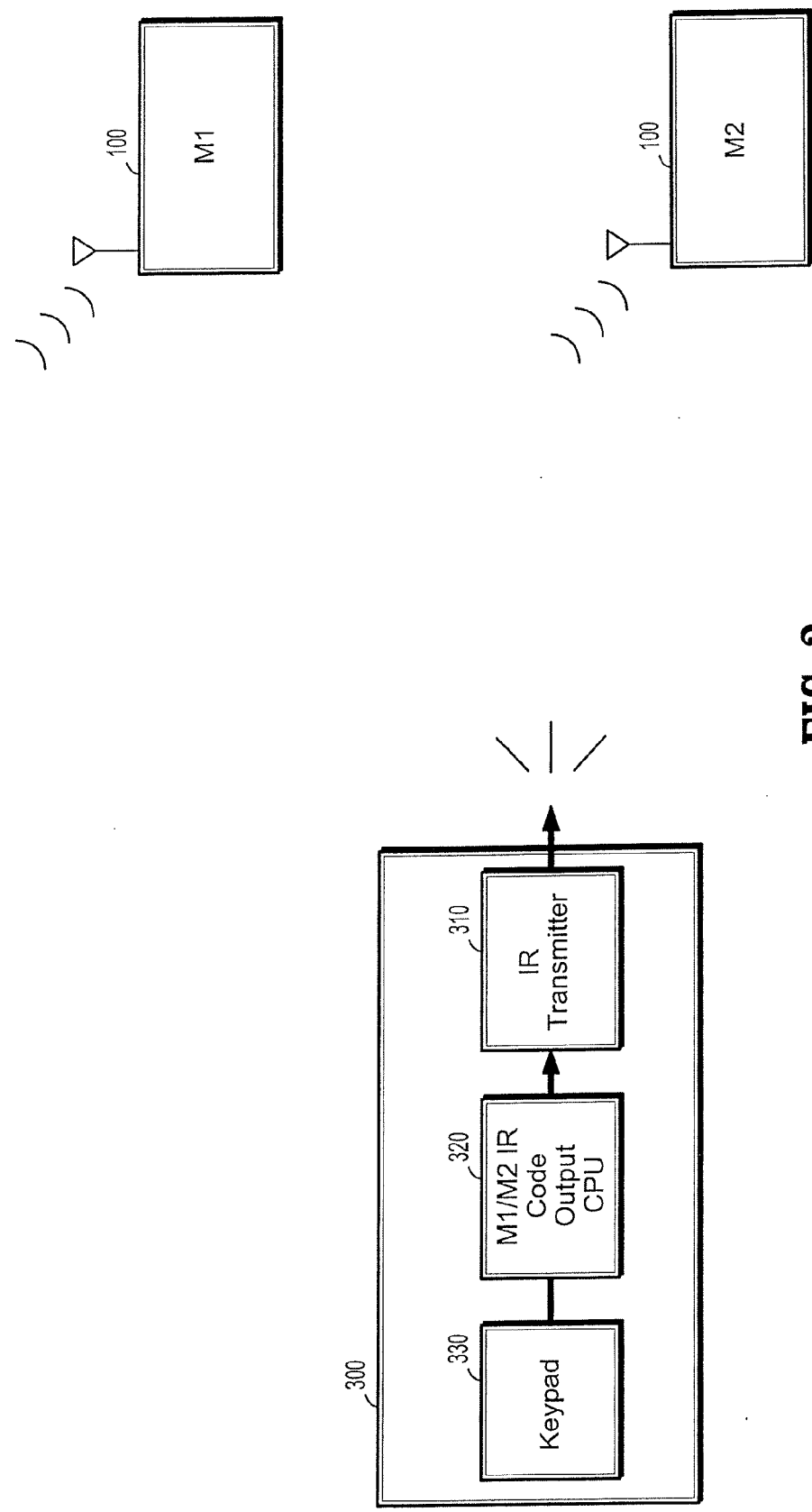
FIG. 3 is a block diagram illustrating a remote control device used to operate an entertainment unit, according to an exemplary embodiment of the present invention.

FIG. 3 is a block diagram illustrating a remote control device used to operate at least two overhead entertainment units 100, according to an exemplary embodiment of the present invention. Referring to FIG. 3, the remote control device 300 includes an IR Transmitter 310, a CPU 320, and a Keypad 330.

The remote control device 300 can be set to one of an M1 and an M2 mode using one or more keys on the Keypad. As an example, the Keypad may include a toggle button with choices labeled M1 and M2, where only one of the choices may be selected at a time. The CPU 320 receives key presses from the Keypad 330 for controlling different entertainment units 100. When the remote control device 300 is set to the M1 mode, the CPU 320 converts the key presses into a first set of remote control commands for controlling an entertainment unit 100 set to the M1 mode. When the remote control device 300 is set to the M2 mode, the CPU 320 converts the key presses into a second set of remote control codes for controlling an entertainment unit 100 set to the M2 mode. The CPU 320 then forwards the remote control codes to the IR transmitter 310 for infrared transmission to the IR receivers 210 of one or more entertainment units 100.

Figure 4:
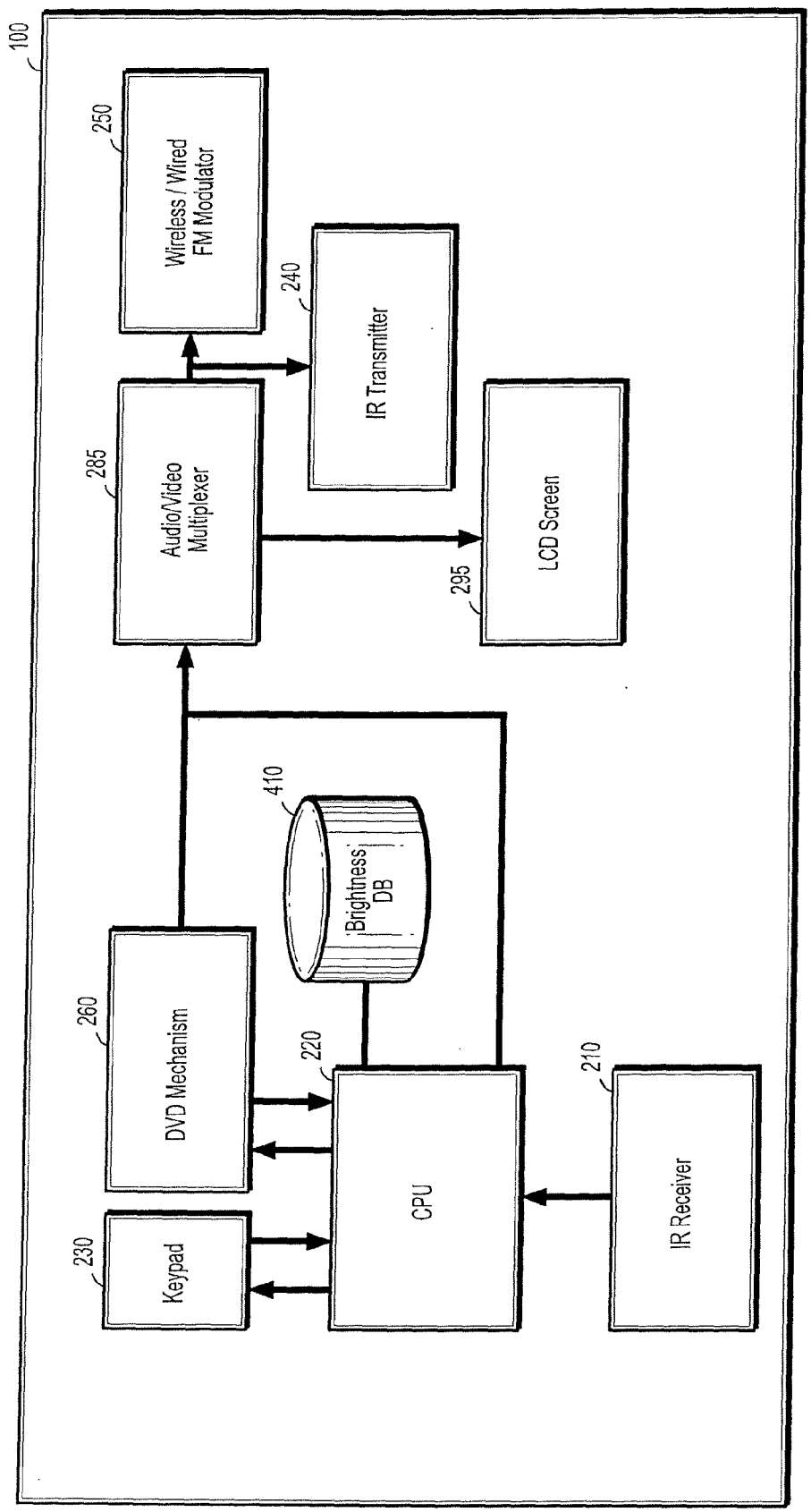
FIG. 4 is a block diagram illustrating an entertainment unit, according to an exemplary embodiment of the present invention.

FIG. 4 is a block diagram illustrating an entertainment unit 100, according to an exemplary embodiment of the present invention. Referring to FIG. 4, the entertainment unit 100 is similar to the unit illustrated in FIG. 2, except that the optional parts are not displayed and an additional brightness database 410 is included.

The entertainment unit 100 includes day and night brightness modes which can be remotely set to adjust the brightness of the LCD screen 295. When the day or evening brightness modes are remotely selected, a corresponding day or evening command is received by the IR receiver 210. Then the CPU 220 retrieves a corresponding pre-defined day brightness level or pre-defined night brightness level from a brightness database 410 and sets the brightness of the LCD Screen 295 accordingly.

The day brightness level may be pre-defined to the maximum brightness of the LCD Screen 295. The day and night brightness levels may also be predefined to any other level supported by the LCD screen 295. The day and night brightness levels may be adjusted by a user through one or more buttons on the Keypad 230 and stored in the brightness database 410.

The entertainment unit 100 is not limited to only two brightness modes, as additional brightness modes may be added as necessary such as, for example, an overcast mode, a dusk mode, etc. The brightness and contrast of the LCD screen 295 can also be modified to any range of values by use of a remote control or the Keypad 230 on the entertainment unit 100.

Figure 5:
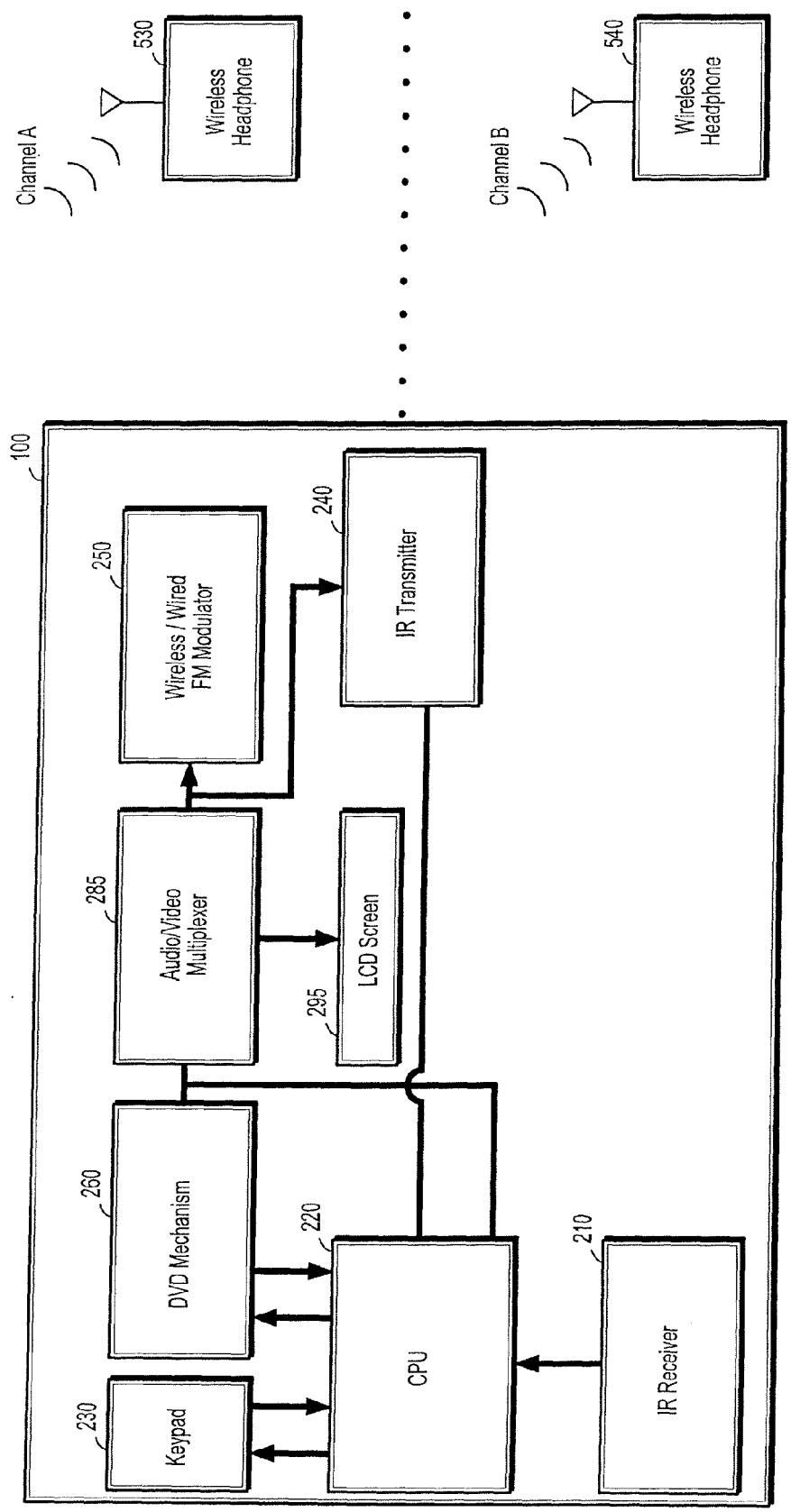
FIG. 5 is a block diagram illustrating an entertainment unit, according to an exemplary embodiment of the present invention.

FIG. 5 is a block diagram illustrating an entertainment unit 100, according to an exemplary embodiment of the present invention. When the entertainment unit 100 is set to mode M1, the CPU 220 directs the IR Transmitter 240 to broadcast audio signals on channel A. When the entertainment unit 100 is set to mode M2, the CPU 220 directs the IR Transmitter 240 to broadcast audio signals on channel B. While FIG. 5 illustrates use of one IR Transmitter to transmit audio signals to channels A and B, in an alternate embodiment of the present invention, two IR transmitters may be provided, one for each channel.

Channels A and B may each represent different frequency bands. As an example, the IR Transmitter 240 may broadcast the audio signals at a range of about 2.3 MHz to about 2.8 MHz across channel A to a first wireless headphone 530 and at a range of about 3.2 MHz to about 3.8 MHz across channel B to a second wireless headphone 540. However, the frequency bands assigned to channels A and B are not limited to these frequency ranges, and can be modified as necessary.

Figure 6:
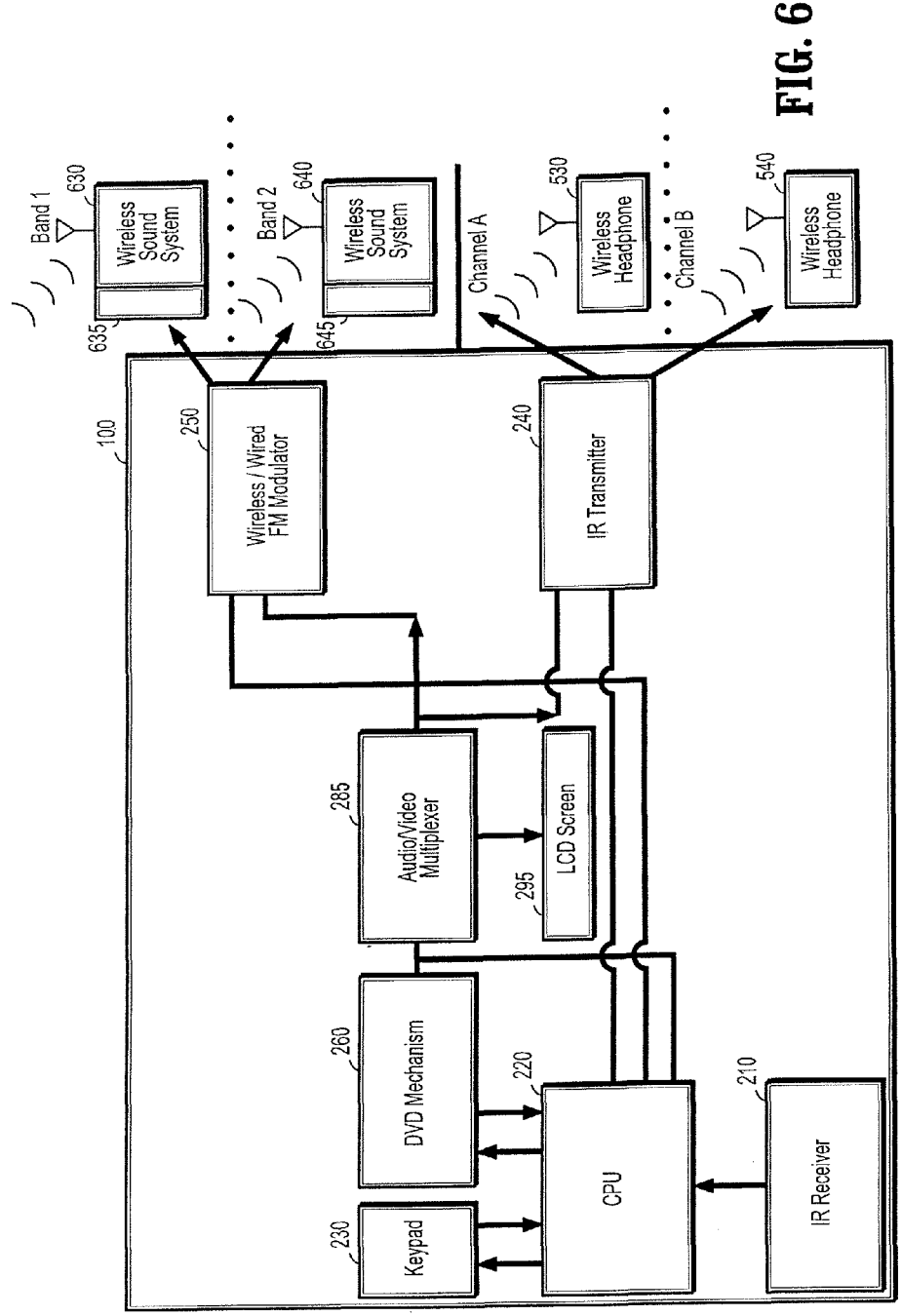
FIG. 6 is a block diagram illustrating an entertainment unit, according to an exemplary embodiment of the present invention.

FIG. 6 is a block diagram illustrating an entertainment unit 100 according to an exemplary embodiment of the present invention. Referring to FIG. 6, when the entertainment unit 100 is in mode M1, the CPU 220 directs the FM modulator 250 to broadcast audio signals in a first band of frequencies for reception by the first wireless sound system 630 and when entertainment unit 100 is in mode M2, the CPU 220 directs the FM modulator 250 to broadcast audio signals in a second band of frequencies for reception by the second wireless sound system 640. The first wireless sound system 630 includes a first FM Tuner 635 which is configured to receive broadcasts in the first band of frequencies. The second wireless sound system 640 includes a second FM Tuner 645 which is configured to receive broadcasts in the second band of frequencies. In an alternate embodiment of the present invention, two FM modulators are provided, one for each band of frequencies.

When the entertainment unit 100 is in mode M1, the CPU 220 may also direct the IR Transmitter 240 to broadcast audio signals across channel A to the first wireless headphone 530, and when the entertainment unit 100 is in mode M2, the CPU 220 may direct the IR Transmitter 240 to broadcast audio signals across channel B to the second wireless headphone 540. In an alternate embodiment of the present invention, two IR transmitters are provided, one for each channel.

The first and second band of frequencies differ from one another and should be separated by a suitable frequency gap to prevent interference. Although a wireless version of the FM modulator 250 is described above with reference to FIG. 6, the FM modulator 250 may be wired directly to a sound system.

Features described in exemplary embodiments of the present invention herein, may be applied to two entertainment systems in a vehicle which can each be separately controlled by a single remote control device.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An entertainment system, comprising:
a media player;
a central processing unit (CPU) configured to interpret a first set of remote control codes and a second set of remote control codes that differs from the first;
an infrared receiver configured to wirelessly receive infrared signals including the first set of remote control codes and the second set of remote control codes and send the first and second sets of remote control codes to the CPU; and
wherein the CPU is configured to operate on a command of the first set of remote control codes but to ignore all commands of the second set of remote control codes, when the system is in a first communication mode,
wherein the CPU is configured to operate on a command of the second set of remote control codes but to ignore all commands of the first set of remote control codes, when the system is in a second other communication mode, and
wherein the CPU is configured to relay data to the media player that corresponds to the command operated on.

2. The entertainment system of claim 1, further comprising a control panel having an option that allows a user to switch the entertainment system between one of the first communication mode and the second communication mode.

3. The entertainment system of claim 2, wherein the control panel is located in a remote control.

4. The entertainment system of claim 1, wherein the media player is one of an MPEG player, a card reader, a DVD player, a CD-ROM player, a video game player, a video cassette player, or a digital video recorder.

5. The entertainment system of claim 1, wherein the entertainment system receives and plays at least one of a digital video disc, a compact disc, a video compact disc, a flash card, a secure digital card, a smart media card or a memory stick card.

6. The entertainment system of claim 1, wherein the first communication mode sets the entertainment system to output an audio signal from the media player to a first audio channel and the second communication mode sets the entertainment system to output the audio signal from the media player to a second audio channel.

7. The entertainment system of claim 6, further comprising:
an infrared transmitter configured to wirelessly send the audio signal across the channels using an infrared signal;
a first wireless sound system that wirelessly receives the infrared signal including the audio signal from the first channel; and
a second wireless sound system that wirelessly receives the infrared signal including the audio signal from the second audio channel.

8. The entertainment system of claim 1, further comprises a display unit set to a pre-stored night brightness level based on an operation by the CPU on a night command of the remote control codes and set to a pre-stored day brightness level based on operation by the CPU on a day command of the remote control codes.

9. An entertainment system, comprising:
an entertainment unit; and
a remote control separate from the entertainment unit, wherein the entertainment unit comprises:
a media player;
a first central processing unit (CPU) configured to interpret a first set of remote control codes and a second set of remote control codes that differs from the first;
an infrared (IR) receiver configured to wirelessly receive infrared signals including the first set of remote control codes and the second set of remote control codes and send the first and second sets of remote control codes to the first CPU,
wherein the remote control comprises:
a keypad;
a button enabling a user to select one of a first mode and a second mode;
an IR transmitter; and
a second CPU configured to convert key presses of the keypad into the first set of remote control codes when the first mode is selected and convert the key presses into the second other set of remote control codes when the second mode is selected, and output the resulting codes to the IR transmitter.

10. The entertainment system of claim 9, wherein the button is a toggle button comprising two choices, and only one of the choices is selectable at a time.

11. The entertainment system of claim 9, wherein the first CPU is configured to operate on a command of the first set of remote control codes but to ignore all commands of the second set of remote control codes when in a first communication mode, wherein the first CPU is configured to operate on a command of the second set of remote control codes but to ignore all commands of the first set of remote control codes when in a second communication mode.

12. The entertainment system of claim 11, wherein the first CPU is configured to relay data to the media player that corresponds to the command operated on.

13. The entertainment system of claim 11, wherein the entertainment unit comprises a control panel having an option that allows a user to switch the entertainment system between one of the first communication mode and the second communication mode.

14. The entertainment system of claim 11, wherein the remote control comprises a control panel having an option that allows a user to switch the entertainment system between one of the first communication mode and the second communication mode.

15. The entertainment system of claim 9, wherein the keypad enables a user to modify a brightness or a contrast of a display unit of the entertainment unit.

16. The entertainment system of claim 9, wherein the media player is one of an MPEG player, a card reader, a DVD player, a CD-ROM player, a video game player, a video cassette player, or a digital video recorder.

17. The entertainment system of claim 9, wherein the entertainment unit receives and plays at least one of a digital video disc, a compact disc, a video compact disc, a flash card, a secure digital card, a smart media card or a memory stick card.

18. The entertainment system of claim 11, wherein the first communication mode sets the entertainment system to output an audio signal from the media player to a first audio channel and the second communication mode sets the entertainment system to output the audio signal from the media player to a second audio channel.

19. The entertainment system of claim 18, further comprising: an infrared transmitter configured to wirelessly send the audio signal across the channels using an infrared signal; a first wireless sound system that wirelessly receives the infrared signal including the audio signal from the first channel; and a second wireless sound system that wirelessly receives the infrared signal including the audio signal from the second audio channel.

20. The entertainment system of claim 9, wherein the entertainment unit comprises a display unit set to a pre-stored night brightness level based on an operation by the first CPU on a night command of the remote control codes and set to a pre-stored day brightness level based on operation by the first CPU on a day command of the remote control codes.

* * * * *